(12) United States Patent
MacArthur et al.

(10) Patent No.: US 11,097,570 B2
(45) Date of Patent: Aug. 24, 2021

(54) TIRE STABILIZER AND METHOD OF USING THE SAME

(71) Applicant: Honda Motor Co., Ltd., Tokyo (JP)

(72) Inventors: Benjamin B. MacArthur, Barrie (CA); Benjamin D. Deboer, Ancaster (CA)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 16/360,499

(22) Filed: Mar. 21, 2019

(65) Prior Publication Data

US 2020/0298620 A1    Sep. 24, 2020

(51) Int. Cl.
| | |
|---|---|
| *B60B 30/02* | (2006.01) |
| *B60S 5/00* | (2006.01) |
| *B60S 9/04* | (2006.01) |
| *B60B 29/00* | (2006.01) |
| *B62D 65/18* | (2006.01) |

(52) U.S. Cl.
CPC ............... *B60B 30/02* (2013.01); *B60S 5/00* (2013.01); *B60S 9/04* (2013.01); *B60B 29/003* (2013.01); *B62D 65/18* (2013.01)

(58) Field of Classification Search
CPC ........ B23Q 3/106; B23Q 3/107; B23Q 3/108; B60B 29/00; B60B 29/001; B60B 29/002; B60B 29/003; B60B 30/00; B60B 30/02; B60S 9/04; B60S 9/02; B60S 9/00; B66F 7/24; B66F 7/243; B66F 7/26
See application file for complete search history.

(56) References Cited

U.S. PATENT DOCUMENTS

| | | | | |
|---|---|---|---|---|
| 2,540,525 A | * | 2/1951 | Howarth | F16F 15/067 248/578 |
| 2,593,538 A | * | 4/1952 | Cleveland | B23Q 3/108 269/310 |
| 3,249,330 A | * | 5/1966 | Preis | F16F 13/00 248/563 |
| 3,572,621 A | * | 3/1971 | Whitten | F16F 15/067 248/548 |
| 5,551,753 A | * | 9/1996 | Glockl | A47C 3/023 248/600 |
| 5,924,683 A | * | 7/1999 | Alchin | F16F 13/02 267/178 |

(Continued)

FOREIGN PATENT DOCUMENTS

CN    204172875 U    2/2015
CN    206691091 U    12/2017

*Primary Examiner* — Tyrone V Hall, Jr.
(74) *Attorney, Agent, or Firm* — American Honda Motor Co., Inc.; Morgan Lincoln (57) ABSTRACT

A tire stabilizer is provided that includes an upper block, a lower block, and a biasing device. The upper block has an inclined surface that is inclined relative to a bottom surface. The biasing device is disposed between the upper block and the lower block. A method of rotating a lug nut of a vehicle that is elevated above a ground surface is also provided. The method includes positioning a tire stabilizer between the ground surface and a tire of the vehicle, placing a wrench over the lug nut, rotating the wrench, removing the wrench from the lug nut, and removing the tire stabilizer from the tire. The tire stabilizer includes an upper block having an inclined surface, a lower block partially disposed within the upper block, and a biasing device disposed between the upper block and the lower block.

11 Claims, 8 Drawing Sheets

(56) References Cited

U.S. PATENT DOCUMENTS

| | | | |
|---|---|---|---|
| 6,773,222 B1 * | 8/2004 | Gilchrist | B60B 29/002 |
| | | | 414/426 |
| 6,851,523 B1 | 2/2005 | Gaster | |
| 7,976,255 B2 | 7/2011 | Anderson et al. | |
| 2003/0012630 A1 * | 1/2003 | Brabson, Jr. | B60B 29/001 |
| | | | 414/429 |

\* cited by examiner

TIRE STABILIZER AND METHOD OF USING THE SAME

BACKGROUND

In a modern automobile assembly plant, a vehicle is often transported from one workstation to another using a vehicle conveyor system. The vehicle conveyor system may lift the vehicle above a ground surface as it is transported, or may move the vehicle directly upon the ground surface (i.e., via an in-ground conveyor belt). If the vehicle is transported upon the ground surface, its tires often maintain contact with a portion of the vehicle conveyor system, such as the conveyor belt. If the vehicle is transported above the ground surface, the vehicle conveyor system may support the vehicle at its frame rather than tires, thus allowing the tires to hang freely without making direct contact with any portion of the vehicle conveyor system.

If the vehicle is being supported at its frame as described above, the wheels and tires of the vehicle may be left to rotate freely in the air upon application of a rotational force. Further, certain operations performed to the vehicle as it is supported by the vehicle conveyor system may require rotation of a lug nut that is coupling the wheel to a hub of the vehicle. If the vehicle is being transported above the ground surface and the tires are left to rotate freely, it may be difficult for a rotational force to be effectively applied to the lug nut, such as with a wrench, without also spinning the wheel itself.

There are known wedge-type devices for use with vehicles positioned on the ground. However, the known devices are not configured to accommodate a vehicle that is elevated above, and independently movable of the ground surface, such as a vehicle positioned on the above ground vehicle conveyor system described herein. As such, it may be beneficial to provide a device configured to stabilize a tire of a vehicle that is elevated above a ground surface, while still permitting the vehicle move independent of the ground surface.

BRIEF SUMMARY

According to one aspect, a tire stabilizer for a tire mounted to a vehicle is provided. The tire stabilizer includes an upper block, a lower block, and a biasing device. The upper block has an inclined surface that is inclined relative to a bottom surface. The biasing device is disposed between the upper block and the lower block.

According to another aspect, a method of rotating a lug nut of a vehicle that is elevated above a ground surface is provided. The method includes positioning a tire stabilizer between the ground surface and a tire of the vehicle, placing a wrench over the lug nut, rotating the wrench, removing the wrench from the lug nut, and removing the tire stabilizer from the tire. The tire stabilizer includes an upper block having an inclined surface, a lower block partially disposed within the upper block, and a biasing device disposed between the upper block and the lower block.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

With reference now to the figures wherein the illustrations are for purposes of illustrating one or more exemplary embodiments and not for purposes of limiting the same, there is shown a tire stabilizer.

Figure 1:
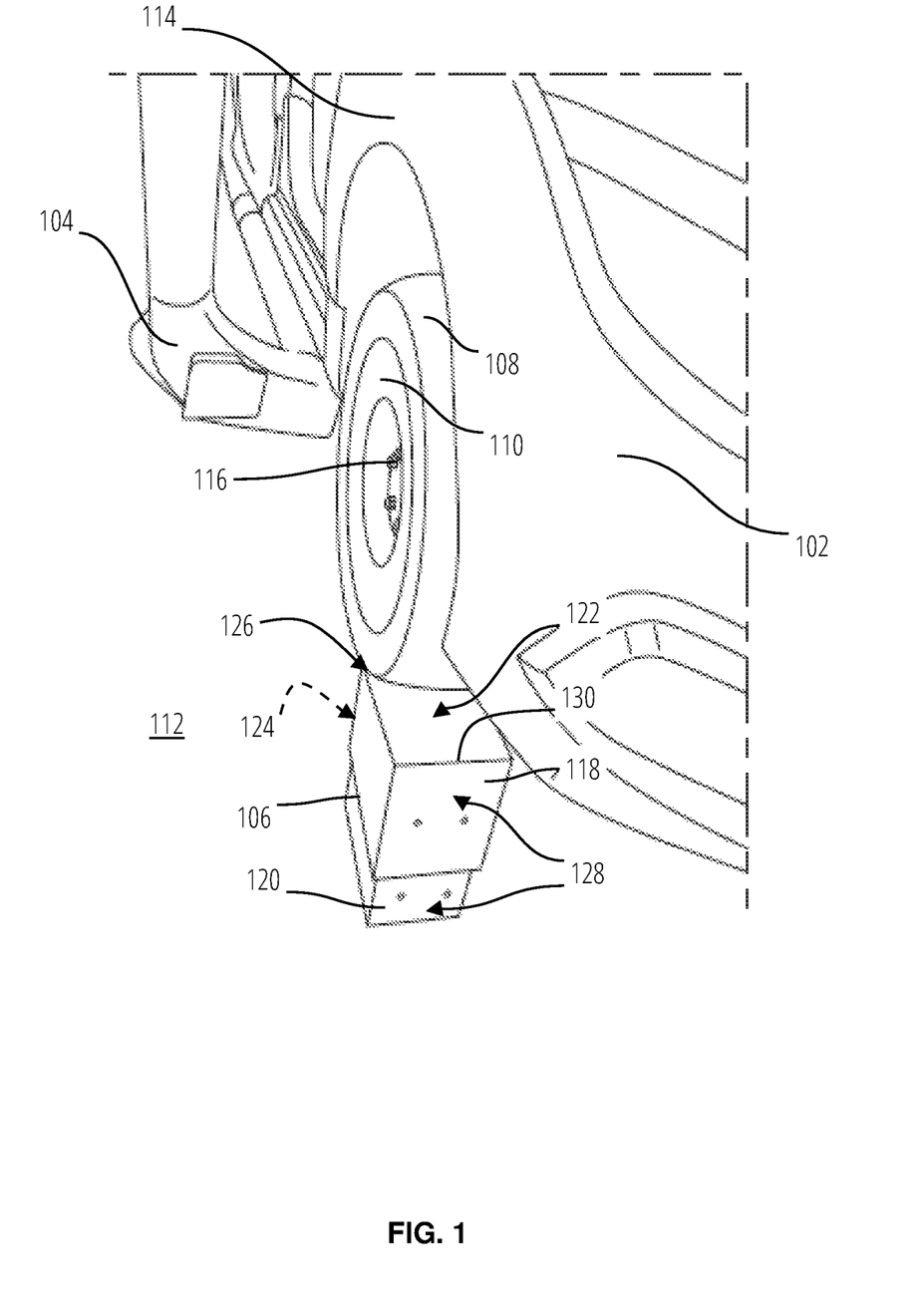
FIG. 1 is a first perspective view of an exemplary embodiment of a vehicle on a vehicle conveyor system with a tire stabilizer between a ground surface and a tire.

FIG. 1 is a perspective view of an exemplary embodiment of a vehicle 102 on a vehicle conveyor system 104 with a tire stabilizer 106 positioned between a ground surface 112 and a tire 108. In FIG. 1 the vehicle 102 is shown from a front passenger corner. The vehicle 102 shown is on a vehicle conveyor system 104 that may be used to transport the vehicle 102 from one workstation to another within a manufacturing facility, for example. The various workstations may require access to a wheel 110 and/or underside of the vehicle 102 for their various tasks. In order to provide clear access for a human operator and/or machine to operate, the vehicle 102 may be elevated above the ground surface 112. In other embodiments the vehicle 102 may also be placed on a lift mechanism that raises and lowers the vehicle 102 above the ground surface 112 while maintaining a horizontal position. The ground surface 112 is often a floor of a building, but may also be a recessed pit or a raised platform in other embodiments where the operator and/or machines are located.

As shown, the vehicle 102 is elevated above the ground surface 112 at a height where a tire 108 of the vehicle 102 is also elevated above the ground surface 112. Vehicles are often configured with a suspension system that allows the tire 108 to move independently of a remainder of the vehicle, referred to herein as a body portion 114, to a limited extent; the range of this independent movement is sometimes referred to as a vehicle's range of suspension travel.

The vehicle conveyor system 104 is coupled to the vehicle 102 at an underside of a body portion 114, allowing the vehicle conveyor system 104 to lift the vehicle 102 independent of the tire 108. The tire 108 is mounted to the wheel 110, which is in turn coupled to the vehicle 102. More specifically, the wheel 110 is coupled to a wheel hub using a lug nut 116, the wheel hub being part of a drivetrain of the vehicle that is coupled to the suspension system. As such, the tire 108 is coupled to the body portion 114 through the suspension system.

Focusing on the drivetrain of the vehicle 102, there may be components located behind the wheel 110 that need servicing while the vehicle 102 is on the vehicle conveyor system 104; for example, replacement of a brake system component such as a rotor or a pad. Removal and installation of the wheel 110 often require rotation of the lug nut 116 using a wrench or ratchet, for example, which in turn places a rotational force on the hub connected thereto. In instances where the wheel hub is not locked in position (i.e., via a brake or drivetrain component such as a transmission), the hub and wheel 110 may rotate while attempting to rotate the lug nut 116 independent of the these other components.

In the exemplary embodiment, the tire stabilizer 106 is configured to prevent the hub and wheel 110 from rotating when the vehicle 102 is on the vehicle conveyor system 104. The tire stabilizer 106 is a wedge-type device that is placed on the ground surface 112 and adjacent the tire 108 to prevent the tire 108 from rotating relative to the ground surface 112. In this position, friction between the tire 108 and the tire stabilizer 106 prevent the tire 108, and thus wheel 110 and hub, from rotating when a rotational force is applied to the lug nut 116.

Another consideration when using a wedge-type device against a tire 108 of a vehicle 102 on an elevated vehicle conveyor system 104 is how the vehicle 102 will behave if the vehicle conveyor system 104 begins moving forward with wedge-type device being used against the tire 108. A fixed wedge-type device may cause the tire 108, and indirectly the body portion 114, of the vehicle 102 to move in an upward direction relative to the vehicle conveyor system 104 as the tire 108 moves up an inclined surface of the wedge-type device. To address this relative movement, the tire stabilizer 106 shown is compressible in a vertical direction relative to the ground surface 112. More specifically, an upper block 118 of the tire stabilizer 106 is moveable in a vertical direction relative to a lower block 120 of the tire stabilizer 106 that is stationary on the ground surface 112. If the vehicle conveyor system 104 moves in a forward direction with the tire stabilizer 106 positioned against a first surface of the tire 108, the tire stabilizer 106 is configured to compress under a weight of the vehicle 102 as the tire 108 moves up an inclined surface 122 of the tire stabilizer 106 and thus avoid any displacement of the vehicle 102 relative to the vehicle conveyor system 104.

The tire stabilizer 106 further includes a first surface 124 and a first edge 126, and a second surface 128 and a second edge 130. The first edge 126 is located at a lower portion of the inclined surface 122. The second edge 130 is located at an upper portion of the inclined surface 122. The first edge 126 further corresponds with a first surface 124 of the tire stabilizer 106, and the second edge 130 corresponds with a second surface 128 of the tire stabilizer 106. More specifically, each of the upper block 118 and the lower block 120 have the first surface 124 and the second surface 128.

Figure 2:
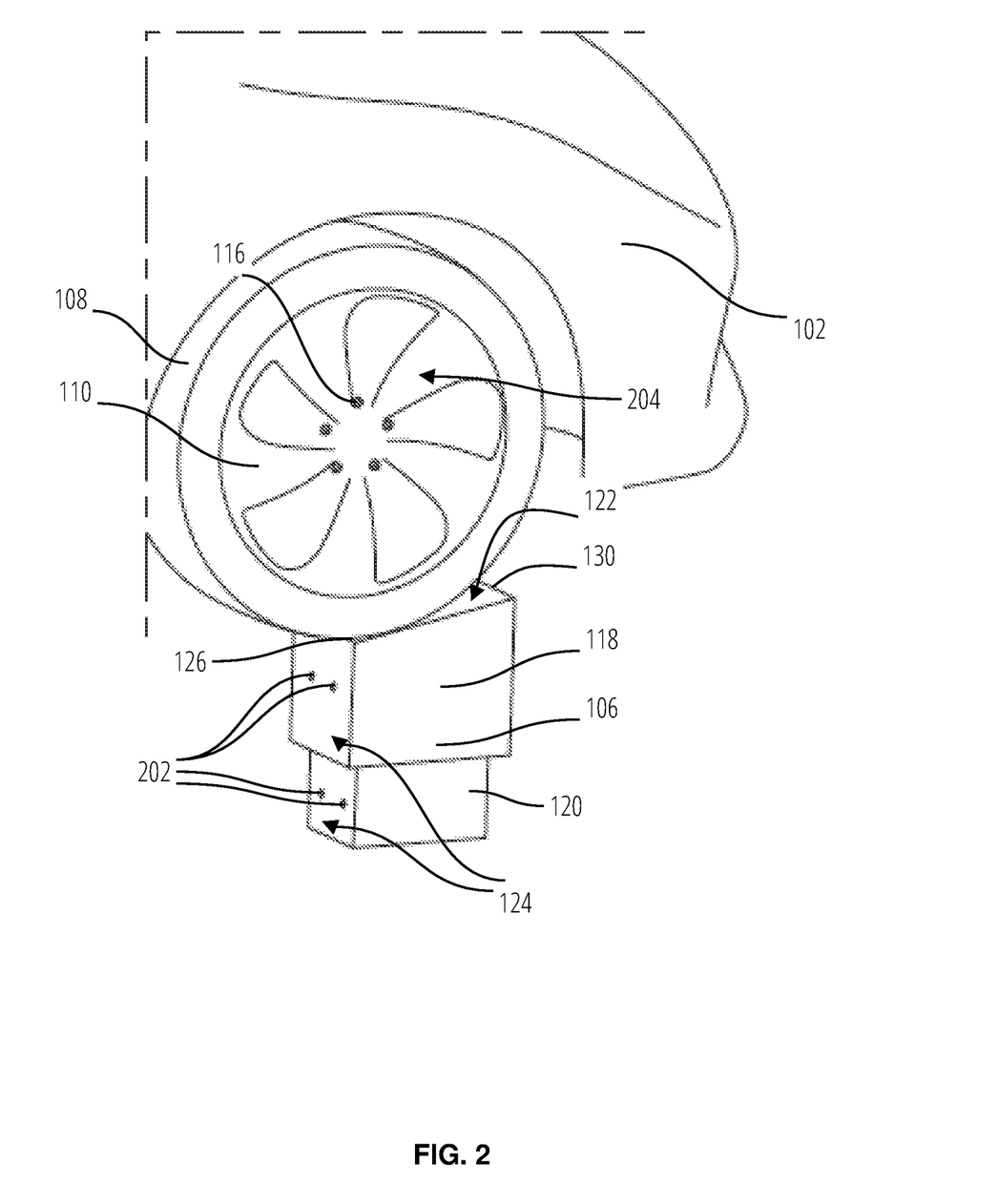
FIG. 2 is a second perspective view of the vehicle and tire stabilizer shown in FIG. 1.

FIG. 2 is a second perspective view of the vehicle 102 and tire stabilizer 106 shown in FIG. 1. In FIG. 2 the vehicle 102 is shown from a rearward position relative to FIG. 1 and angled towards the wheel 110 located at its front passenger corner. As in FIG. 1, the inclined surface 122 of the tire stabilizer 106 is positioned adjacent the tire 108. The tire 108 is positioned at the first edge 126 of the tire stabilizer 106 in FIG. 2. The wheel 110 also includes a wheel face 204 defining a surface of the wheel 110 as viewed from an exterior of the vehicle 102.

In the depicted embodiment the lower block 120 is substantially smaller in size than, and configured to slide into the upper block 118. More specifically, the lower block 120 is configured to slide into an aperture defined in the upper block 118. However, in other embodiments the lower block 120 may be larger than the upper block 118, and therefore the upper block 118 may be configured to slide into an aperture defined in an upper surface of the lower block 120.

The tire stabilizer 106 also includes a through-hole 202 defined therein that extends from the first surface 124 to the second surface 128. As shown in the depicted embodiment, each of the upper block 118 and the lower block 120 include two of the through-hole 202. In other embodiments, the tire stabilizer 106 may include more (i.e., 6) or less (i.e., 2) of the through-hole 202, so long as each of the upper block 118 and lower block 120 include at least one through-hole 202.

Figure 3:
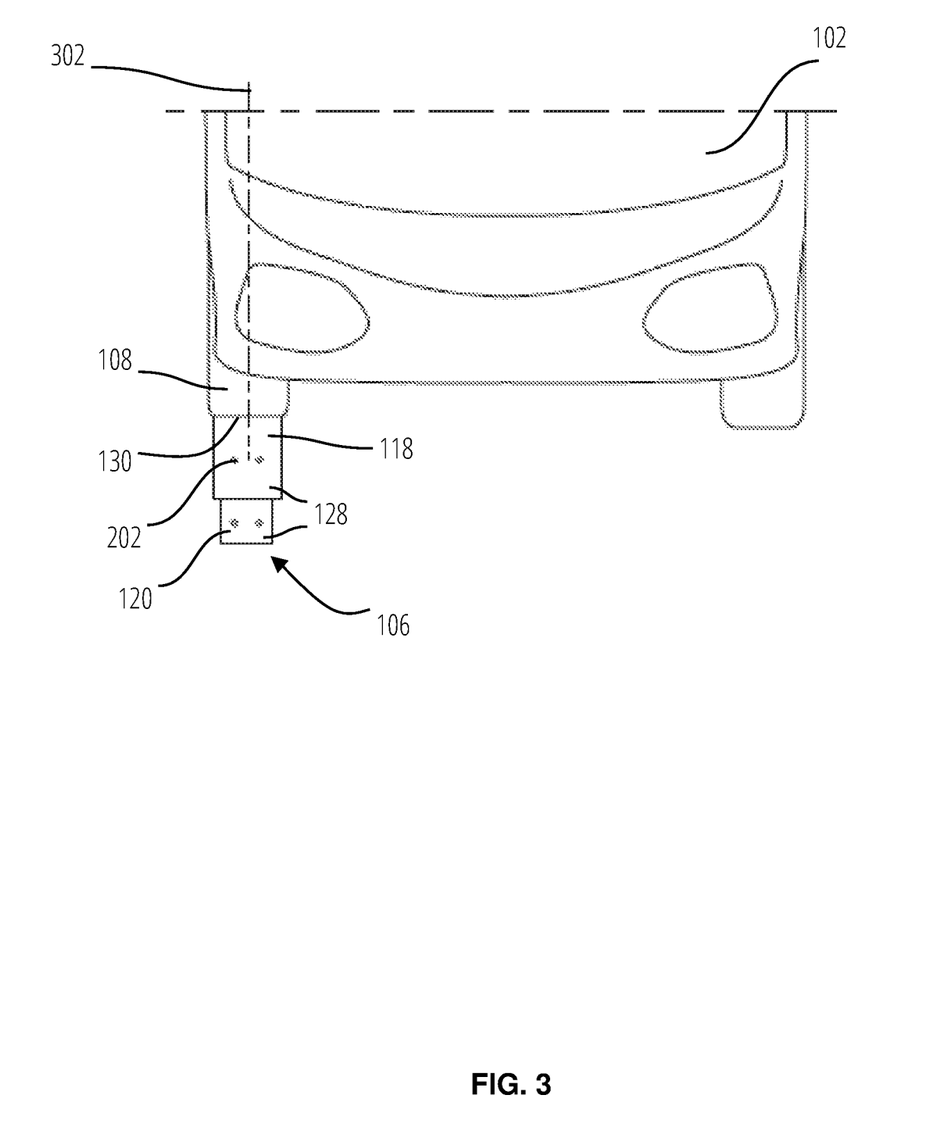
FIG. 3 is a front view of the vehicle and tire stabilizer shown in FIG. 1.

FIG. 3 is a front view of the vehicle 102 and tire stabilizer 106 shown in FIG. 1 and FIG. 2. The tire stabilizer 106 is positioned in a substantially center location of a tread portion of the tire 108, referred to hereinafter as a tread centerline 302. In other embodiments the tire stabilizer 106 may be off-center relative to the tread centerline 302; however, the tire stabilizer 106 will still maintain contact with at least half of the tread portion of the tire 108.

Figure 4:
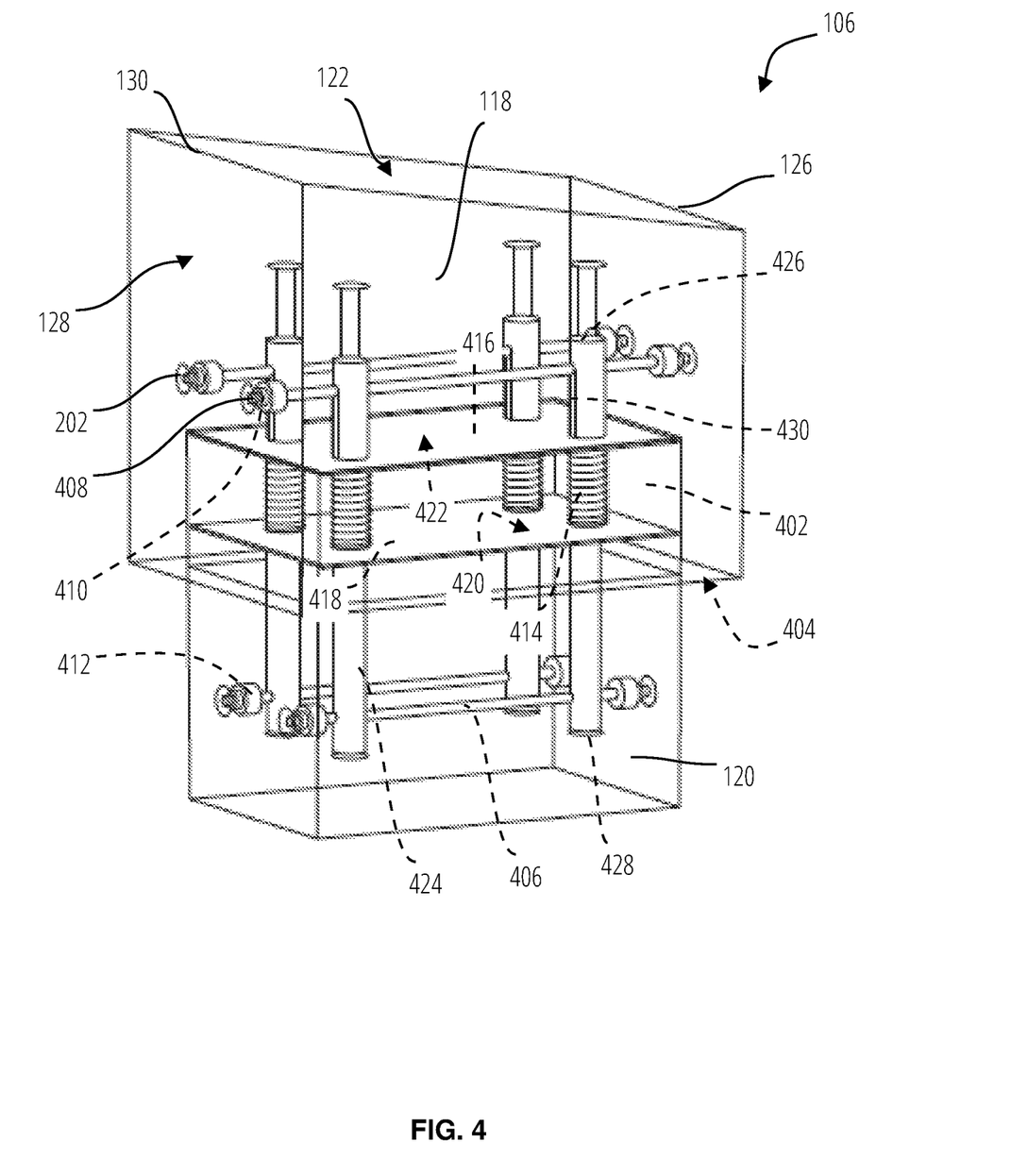
FIG. 4 is a first perspective view of the tire stabilizer shown in FIG. 1.

FIG. 4 is a perspective view of the tire stabilizer according to an exemplary embodiment. The tire stabilizer may be, for example, the tire stabilizer 106 shown in FIG. 1 to FIG. 3. As previously described, the tire stabilizer 106 includes the upper block 118 and the lower block 120. Each of the upper block 118 and the lower block 120 has a substantially rectangular block shape, wherein the upper block 118 further includes the inclined surface 122. The lower block 120 slides into an aperture 402 defined in a bottom surface 404 of the upper block 118, and each of the upper block 118 and the lower block 120 also includes two of the through-hole 202 in the depicted embodiment.

Each of the through-hole 202 further includes a horizontal shaft 406 extending therethrough. The horizontal shaft 406 extends from the first surface 124 to the second surface 128. The horizontal shaft 406 also includes a threaded portion 408 at each end. More specifically, the horizontal shaft 406 includes the threaded portion 408 at each end extending to the first surface 124 and the second surface 128. A nut 410 may be coupled to the threaded portion 408 and tightened against each of the first surface 124 and the second surface 128; more specifically, tightened against a counter-sink formed at each of the first surface 124 and the second surface 128 of the through-hole 202. A spacer 412 may also be disposed between the nut 410 and the first surface 124 and/or the second surface 128.

It is understood that although one of certain features (i.e., the horizontal shaft 406, threaded portion 408, and nut 410) are identified in the Figures, the disclosed embodiment may include more (e.g., four) of these features. Other embodiments may include more (i.e., six) or less (i.e., two) of these features.

The tire stabilizer 106 further includes a biasing device 414 positioned between a first plate 416 located within the aperture 402 of the upper block 118 and a second plate 418 located at a top surface 420 of the lower block 120. More specifically, the first plate 416 is positioned adjacent a ceiling 422 of the aperture 402. The biasing device 414 may include a spring, a hydraulic element, and/or any other type of device that allows the tire stabilizer 106 to function as described herein. The first plate 416 and the second plate 418 are configured to provide a seat for the top and bottom end of the biasing device 414. In other embodiments, the first plate 416 and the second plate 418 may not be present; in these alternative embodiments, the top and bottom end of the spring may be seated directly on the bottom surface 404 of the upper block 118 and the top surface 420 of the lower block 120, respectively. The first plate 416 and the second plate 418 may comprise a metal material or a plastic material. As previously stated, the disclosed embodiment includes four of the biasing device 414; however, other embodiments may include fewer or more biasing device 414.

The tire stabilizer 106 further includes a vertical shaft 424. The disclosed embodiment includes four of the vertical shaft 424, corresponding with the number of biasing device 414. The biasing device 414 is disposed around the vertical shaft 424, providing a guide for the biasing device 414 to compress and extend along a predetermined path, and also maintain a lateral position of the biasing device 414 relative to the first plate 416 and the second plate 418. The horizontal shaft 406 extends through each of an upper end 426 and a lower end 428 of the vertical shaft 424. More specifically, the horizontal shaft 406 at the upper end 426 of the vertical shaft 424 extends through a slot aperture 430 extending in a radial direction through the vertical shaft 424; the horizontal shaft 406 at the lower end 428 extends through a through-hole extending through the vertical shaft 424. The slot aperture 430 allows the horizontal shaft 406 to remain perpendicular to the vertical shaft 424. At the upper end 426, the horizontal shaft 406 may slide vertically in an axial direction along a length of the vertical shaft 424 within the slot aperture 430. The upper end 426 is disposed within the upper block 118, and the lower end 428 is disposed within the lower block 120. It should be noted that although specific features (i.e., upper end 426, lower end 428, slot aperture 430, etc.) are identified in FIG. 4 and FIG. 5 with respect to one vertical shaft 424, each vertical shaft 424 shown herein may include these features.

The upper block 118 and lower block 120 each include a vertical hole for receiving the vertical shaft 424, and a horizontal hole for receiving the horizontal shaft 406. The number of vertical hole and horizontal hole may correspond with the number of vertical shaft 424 and horizontal shaft 406, respectively. These holes may be created by drilling through each of the blocks, or during forming of the blocks.

Each of the upper block 118 and the lower block 120 may comprise a foam material. The foam material may be of a solid and/or dense variety of foam. The foam material provides the tire stabilizer 106 with a light weight for easy manipulation by the operator. Additionally, the foam material may provide a texture on its surface (i.e., the inclined surface 122) that aids in providing grip against the tire 108 and ground surface 112. Alternatively, the upper block 118 and the lower block 120 may comprise a lightweight plastic or rubber material in other embodiments having similar weight and surface texture characteristics.

Figure 5:
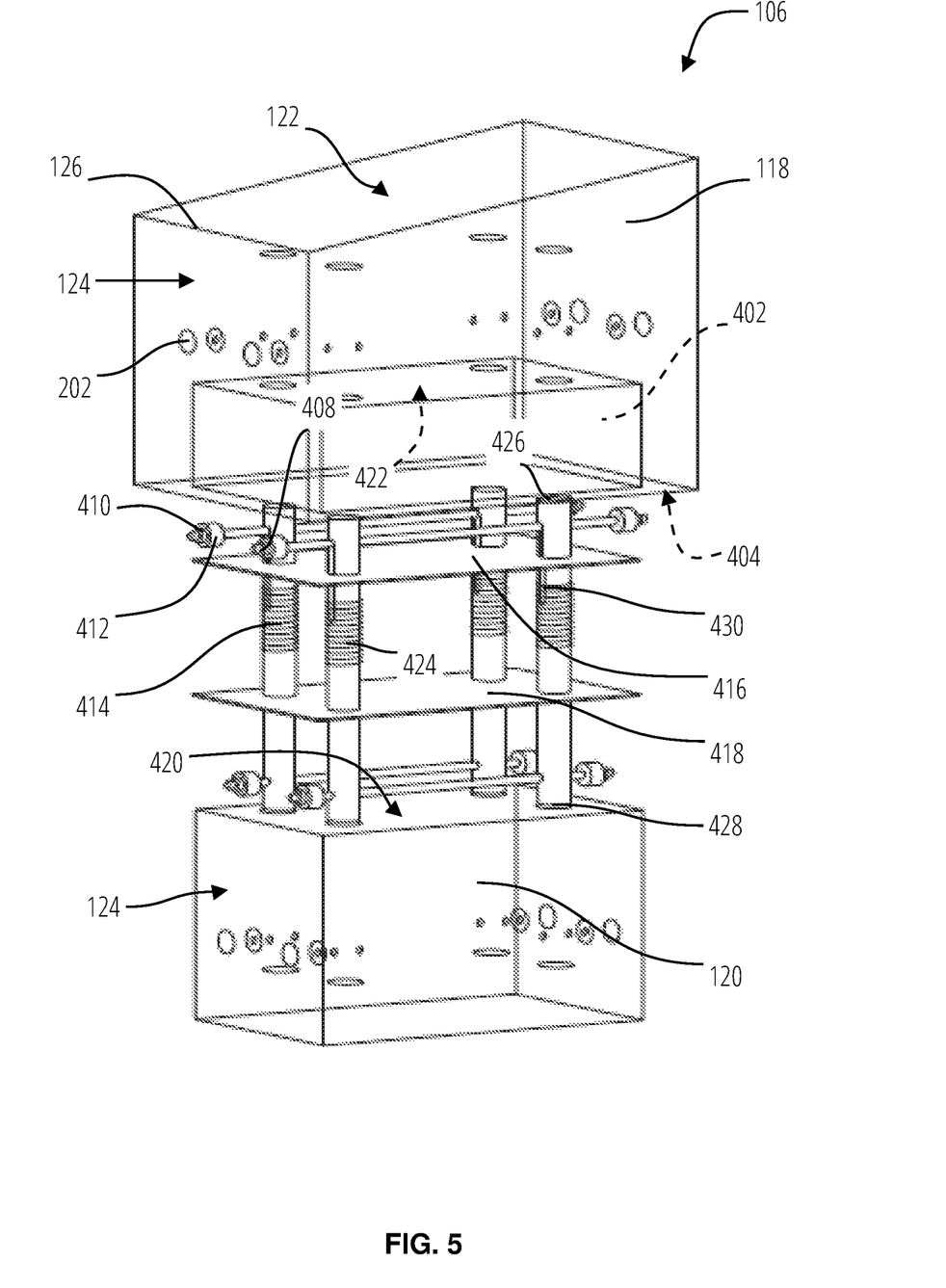
FIG. 5 is a second perspective view of the tire stabilizer shown in FIG. 1.

FIG. 5 is a second perspective view of the tire stabilizer 106 shown in FIG. 4. As previously stated, the nut 410 is included at each end of the horizontal shaft 406. More specifically, the nut 410 is coupled to the threaded portion 408 of the horizontal shaft 406 at each of the first surface 124 and the second surface 128. The nut 410 is configured to maintain an axial position of the horizontal shaft 406 within the through-hole 202. The spacer 412 may be disposed between the nut 410 and each of the first surface 124 and the second surface 128; more specifically, between the nut 410 and the counter-sink that may be defined within each of the first surface 124 and the second surface 128.

Further, as previously described, the aperture 402 is defined in the bottom surface 404 of the upper block 118 and is configured to receive the top surface 420 of the lower block 120. In other words, the lower block 120 is configured to slide into the aperture 402 of the upper block 118. The lower block 120 may slide into the aperture 402 of the upper block 118 if a downward force is applied to the inclined surface 122, causing the biasing device 414 to compress and displace the upper block 118 in a downward direction relative to the lower block 120 that is positioned on the ground surface 112.

In an alternative embodiment, the aperture 402 may be defined in the top surface 420 of the lower block 120. In this alternative embodiment, the upper block 118 may be configured to slide into the lower block 120; more specifically, the bottom surface 404 of the upper block 118 may be configured to slide into the aperture 402 defined in the top surface 420 of the lower block 120.

Figure 6:
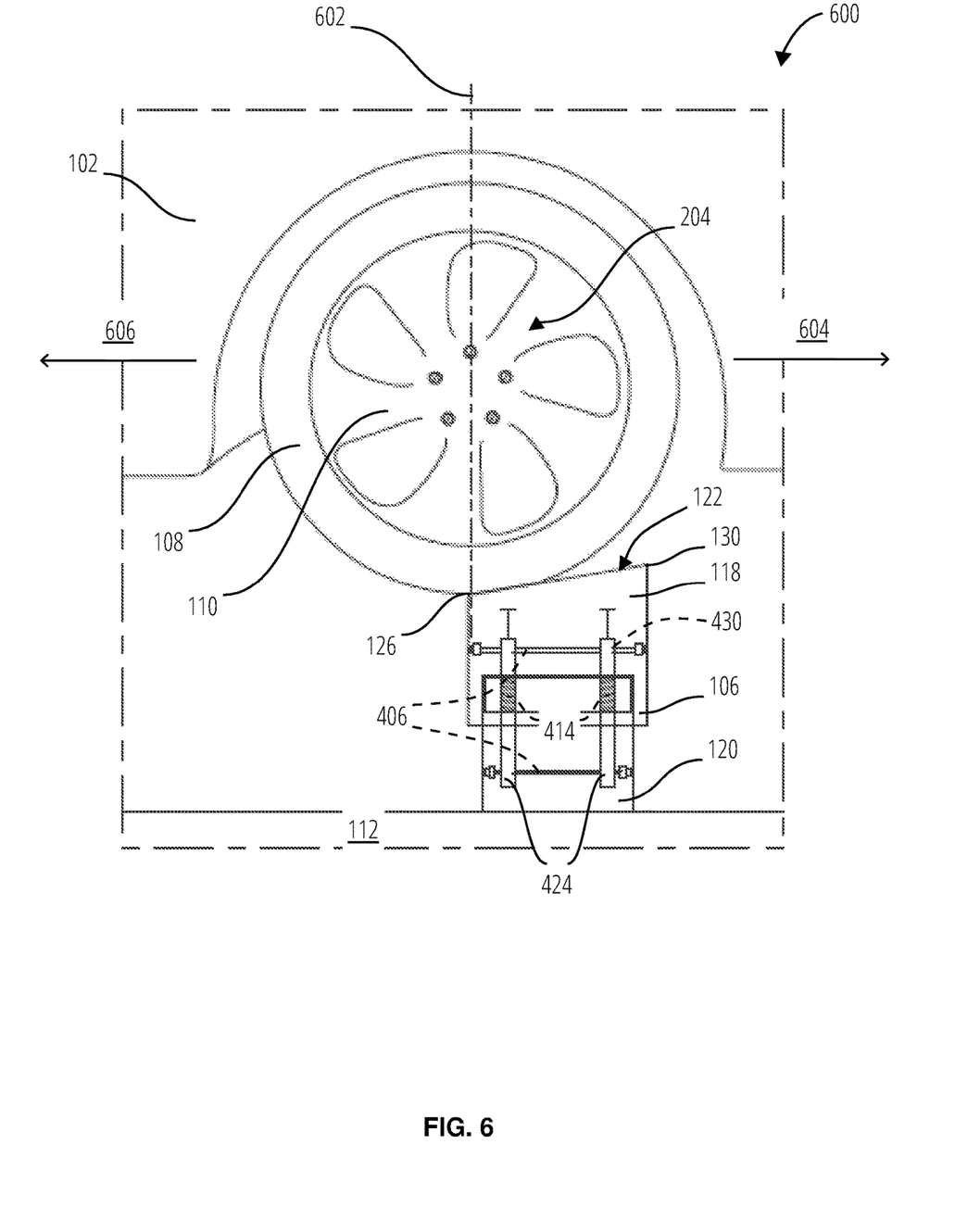
FIG. 6 is a first side view of the vehicle and tire stabilizer shown in FIG. 1, wherein the tire stabilizer is in an extended state.

FIG. 6 is a side view of the vehicle 102 and tire stabilizer 106 shown in FIG. 1, wherein the tire stabilizer 106 is in an extended state 600. As shown in FIG. 6, the tire 108 is positioned near the first edge 126 of the tire stabilizer 106. In the extended state 600, the horizontal shaft 406 is positioned at an upper limit of the slot aperture 430, and the biasing device 414 is in a minimal state of compression. The tire stabilizer 106 may be in this extended state 600 if there is no weight or downward force applied to the inclined surface 122.

Also shown in FIG. 6 is a vertical center axis 602 identifying a centerline of the wheel 110, and a right 604 and left 606 direction relative to the wheel face 204. In the embodiment shown herein, the tire stabilizer 106 is positioned on the right 604 side of the tire 108 such that the inclined surface 122 is angled downward toward the vertical center axis 602. More specifically, the tire stabilizer 106 is oriented such that the first edge 126, defining a lower portion of the inclined surface 122 is directed towards the vertical center axis 602. The tire stabilizer 106 is positioned on the right 604 side of the tire 108 when applying a rotational force onto the lug nut 116 in a clockwise direction; the rotational force by the wrench on the lug nut 116 in this configuration will cause the tire 108 to apply a force in an upward direction relative to the inclined surface 122 and thus cause the tire stabilizer 106 to become further wedged between the ground surface 112 and the tire 108. In other words, the rotation of the tire 108 with draw the tire stabilizer 106 under the tire 108. This, in turn, will prevent the tire 108 from rotating as the wrench applies the rotational force to the lug nut 116. In other embodiments wherein the wrench may apply a rotational force onto the lug nut 116 in a counterclockwise direction, the tire stabilizer 106 may be positioned on the left 606 side of the tire 108 with the first edge 126 directed towards the vertical center axis 602.

Figure 7:
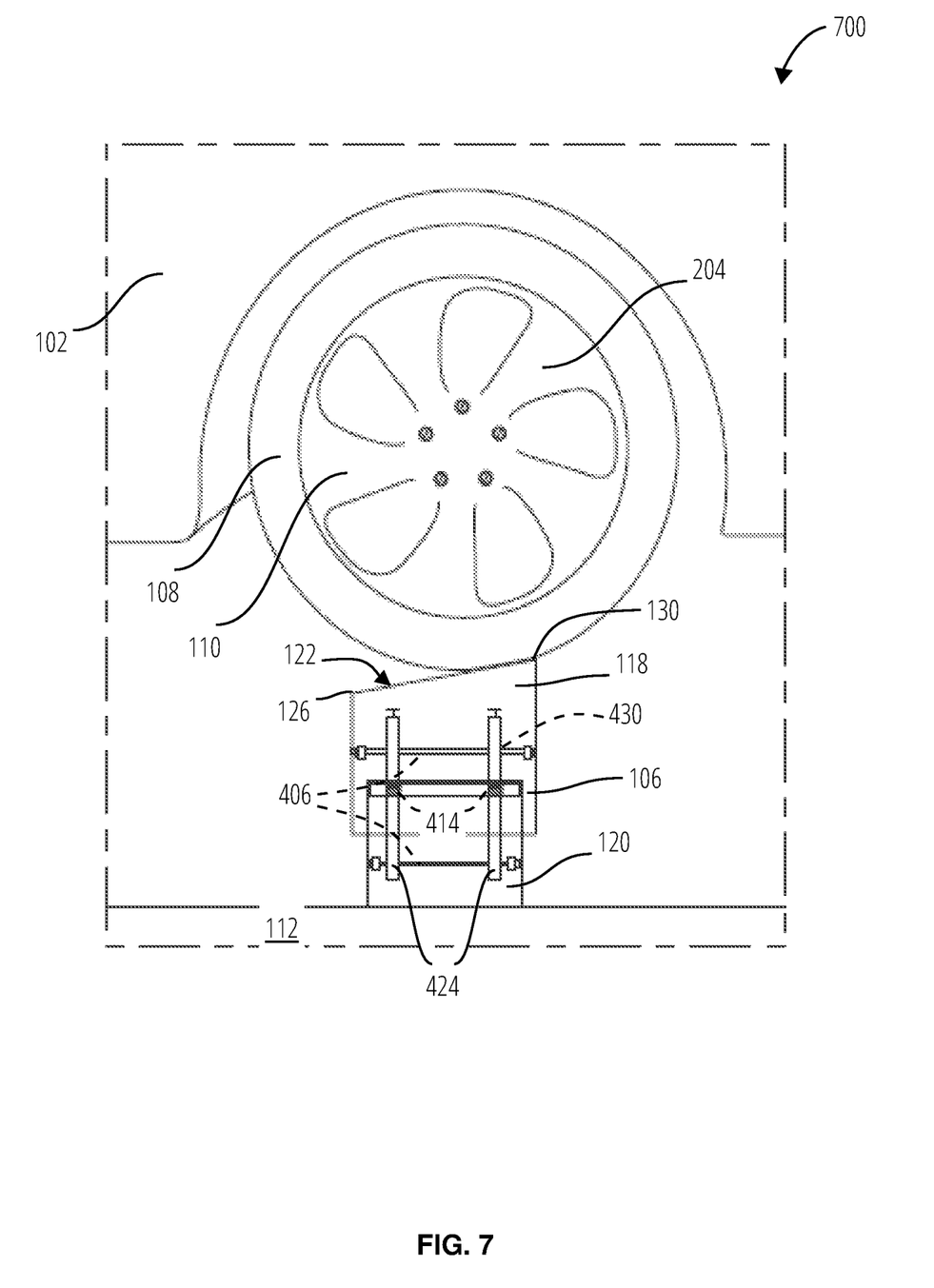
FIG. 7 is a second side view of the vehicle and tire stabilizer shown in FIG. 1, wherein the tire stabilizer is in a partially compressed state.

FIG. 7 is a second side view of the vehicle 102 and tire stabilizer 106 shown in FIG. 1, wherein the tire stabilizer 106 is in a partially compressed state 700. As shown in FIG. 7, the tire 108 is positioned near the second edge 130 of the tire stabilizer 106. In the compressed state 700, the horizontal shaft 406 is located away from the upper limit of the slot aperture 430; for example, the horizontal shaft 406 may be located at a lower limit of the slot aperture 430 or any position therebetween. The biasing device 414 is in a state of compression as the tire stabilizer 106 is in a partially compressed state 700. In a further embodiment the tire stabilizer 106 may be in a fully compressed state if the horizontal shaft 406 is located at the lower limit of the slot aperture 430.

To be clear, the tire stabilizer 106 is in a compressed state if there is a weight or downward force applied to the inclined surface 122, such as the weight of the vehicle 102 positioned thereupon. As between FIG. 6 and FIG. 7, the vehicle 102 has moved in position from near the first edge 126 to near the second edge 130 of the tire stabilizer 106. The distance between the vehicle 102, more specifically the tire 108, and the ground surface 112 remains substantially constant, however the tire stabilizer 106, more specifically the upper block 118, has displaced in a downward direction relative to the ground surface 112 to account for a difference in height between the first edge 126 and the second edge 130 of the tire stabilizer 106 as the tire 108 progressed along the inclined surface 122.

Figure 8:
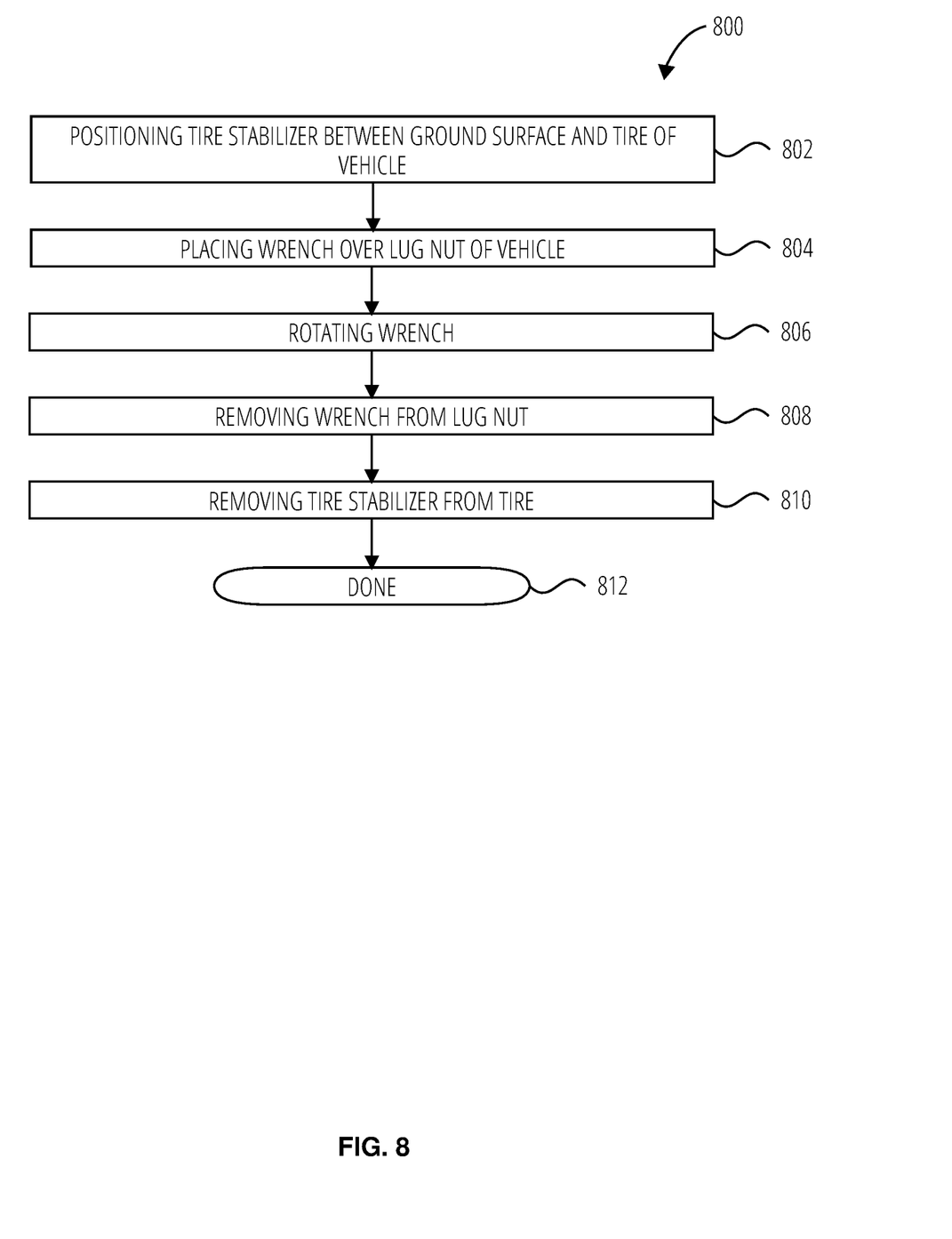
FIG. 8 is a flow chart of a method of rotating a lug nut on a vehicle that is elevated above a ground surface on a vehicle conveyor system using a tire stabilizer, for example, the tire stabilizer shown in FIG. 1.

FIG. 8 is a flow chart of a method 800 of rotating a lug nut on a vehicle that is elevated above a ground surface on a vehicle conveyor system using a tire stabilizer; for example, the vehicle 102, vehicle conveyor system 104, and tire stabilizer 106 shown in FIG. 1. In an exemplary embodiment, the method 800 includes positioning 802 the tire stabilizer 106 against the tire 108 of the vehicle 102, placing 804 a wrench over the lug nut 116 of the vehicle 102, rotating 806 the wrench, removing 808 the wrench from the lug nut 116, and removing 810 the tire stabilizer 106 from the tire 108.

Positioning 802 the tire stabilizer 106 includes placing the tire stabilizer 106 rightly against the tire 108; more specifically, placing the inclined surface 122 against a tread portion of the tire 108, wherein the tire 108 is coupled to the wheel 110 that is, in turn, coupled to the vehicle 102 via the lug nut 116. In an alternative embodiment, positioning 802 the tire stabilizer 106 includes orienting the tire stabilizer 106 so the inclined surface 122 is angled downward towards the vertical center axis 602 of the wheel 110. In another embodiment, positioning 802 the tire stabilizer 106 includes placing the tire stabilizer 106 on the left 606 side of the tire 108, relative to the wheel face 204, when rotating the wrench in a counterclockwise direction. In a further embodiment, positioning 802 the tire stabilizer 106 includes placing the tire stabilizer 106 on a right 604 side of the tire 108 when rotating the wrench in a clockwise direction.

Placing 804 the wrench over the lug nut 116 includes placing a working end of the wrench onto the lug nut 116 such that a rotational force can be applied by the wrench to the lug nut 116. In configurations wherein the vehicle 102 includes a plurality of the lug nut 116, as shown in FIG. 1 through FIG. 7, the wrench may be placed onto each lug nut 116 individually as desired. The wrench may be placed on the lug nut 116 by a human operator, or by a robot or other automated machinery.

Rotating 806 the wrench includes applying a rotational force to the working end of the wrench that was placed on the lug nut 116 in the previous step. The rotational force may be applied manually by the operator to a handle portion of the wrench, or may be applied by a powered drive mechanism, such as a DC tool for example.

Removing 808 the wrench from the lug nut 116 includes removing the working end of the wrench from the lug nut 116. The wrench may be removed manually by the operator, or by a robot or other automated machinery.

Removing 810 the tire stabilizer 106 from the tire 108 includes removing the tire stabilizer 106 from adjacent the tread portion of the tire 108. In an alternative embodiment wherein the tire stabilizer 106 is in the partially compressed state 700 against the tire 108, as shown in FIG. 7, removing the tire stabilizer 106 may include compressing the upper block 118 towards the ground surface 112 before removing the tire stabilizer 106 from adjacent the tire 108.

The foregoing detailed description of exemplary embodiments is included for illustrative purposes only. It should be understood that other embodiments could be used, or modifications and additions could be made to the described embodiments. Therefore, the disclosure is not limited to the embodiments shown, but rather should be construed in breadth and scope in accordance with the recitations of the appended claims.

What is claimed is:

1. A tire stabilizer for a tire mounted to a vehicle, comprising:
    an upper block having an inclined surface that is inclined relative to a bottom surface;
    a lower block; and
    a biasing device disposed between the upper block and the lower block; and
    wherein each of the upper block and the lower block comprises a foam material.

2. The tire stabilizer of claim 1, wherein the lower block is configured to partially slide into an aperture defined within the upper block.

3. The tire stabilizer of claim 2, wherein the upper block further includes a top surface, and wherein the top surface is the inclined surface and the aperture is defined within the bottom surface.

4. The tire stabilizer of claim 1, wherein the upper block is configured to partially slide into an aperture defined within the lower block.

5. The tire stabilizer of claim 1, wherein the biasing device is configured to compress under a weight of the vehicle, and also to apply sufficient pressure to the tire to prevent rotation of the tire while a rotational force is applied to a lug nut coupling the tire to the vehicle.

6. The tire stabilizer of claim 1, wherein the tire is mounted to a wheel that has a wheel face on an exterior surface that faces an outside direction relative to the vehicle.

7. The tire stabilizer of claim 1, wherein the inclined face is configured to be placed adjacent the tire at one of a forward or rearward direction relative to vehicle travel.

8. The tire stabilizer of claim 1, further comprising a vertical shaft around which the biasing device is coiled that has an upper end disposed within the upper block, and a lower end disposed within the lower block.

9. The tire stabilizer of claim 8, further comprising a horizontal shaft extending through one of a slot aperture and a through-hole at each of the upper end and the lower end of the vertical shaft.

10. The tire stabilizer of claim 9, wherein one of the horizontal shaft extends horizontally through each of the upper block and the lower block.

11. The tire stabilizer of claim 9, wherein the horizontal shaft has a threaded portion at each end, and a nut threaded onto each of the threaded portion.

* * * * *